(Specimens.)
J. T. ALLEN.
ROCK FACE PLASTER SLAB AND PROCESS OF MAKING SAME.
No. 536,993.  Patented Apr. 9, 1895.
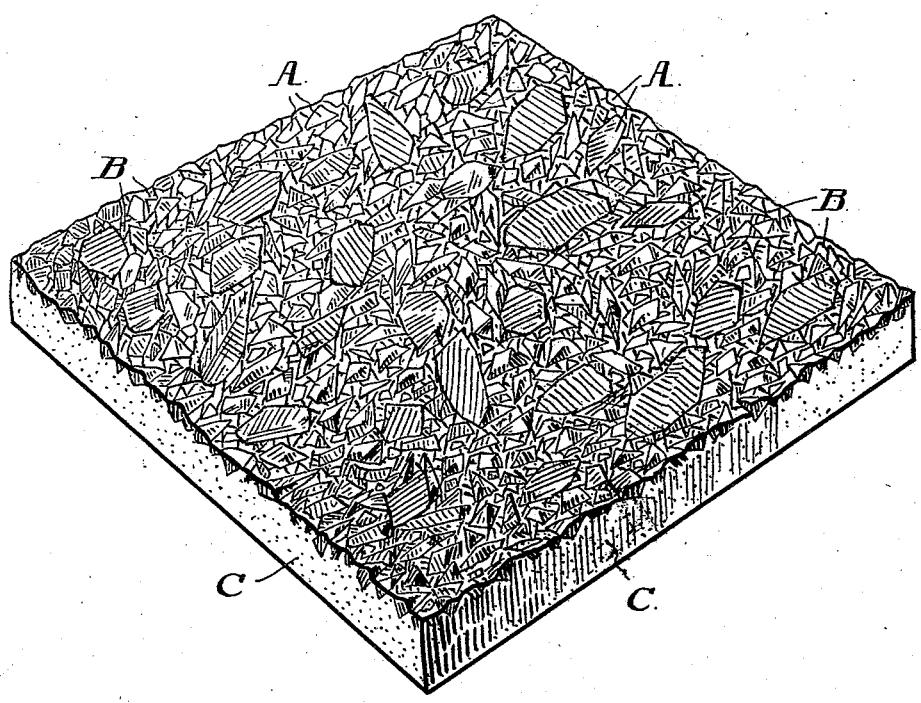
WITNESSES:
J. A. Thompson
Harold Goodwin
INVENTOR
James Turley Allen.

UNITED STATES PATENT OFFICE.

JAMES TURLEY ALLEN, OF PHILADELPHIA, PENNSYLVANIA.

ROCK-FACE PLASTER SLAB AND PROCESS OF MAKING SAME.

SPECIFICATION forming part of Letters Patent No. 536,993, dated April 9, 1895.

Application filed August 11, 1891. Serial No. 402,365. (Specimens.)

*To all whom it may concern:*

Be it known that I, JAMES TURLEY ALLEN, a citizen of the United States, residing at Philadelphia, in the county of Philadelphia and Commonwealth of Pennsylvania, have invented a new and useful Form and Composition of Surface for a Plaster Slab or Strip for use in Building, of which the following is a specification.
The nature and object of my invention is to facilitate the plastering of houses and buildings by forming plaster slabs, in the shop or elsewhere, ready to receive the white or finishing coat, so that they can be nailed in place in the building instead of plastering lath, and receive the white coat at once, thus avoiding all the dirt in the building under construction or repair, usually caused by the mixing and putting on of the brown coats of mortar, and the delay incident to their drying. I am aware that there are several kinds of plaster slabs or strips on the market having this end in view, but they are all defective in requiring the use of a large amount of water to moisten then, either when on the wall or just before their attachment to it; before the white coat or any coat can be successfully applied, thereby causing dirt and delay for drying. I avoid this and save time by producing such a surface on a slab as to render nailing it up wet, or wetting it after it is up, unnecessary.

I form the slab, strip, plate, or board of plaster or cement of the ordinary constituents, and, preferably with cocoanut or other fiber running through it to give greater cohesion for handling safely and nailing, and of the ordinary size of such slabs or plates, say, four feet long by sixteen inches wide and five eighths to three quarters of an inch thick. To prevent the cracking of the coat over the joints of the slabs or boards, I reduce their thickness at the edges about one eighth of an inch by a slight bevel about an inch wide.
This allows of greater thickness of mortar or plaster in the coat, and consequent increased strength on these lines.

Reference is to be had to the accompanying drawing, forming a part of this specification, in which C, C, is the slab or plate of plaster, A, A, the spalls or chips of stone forming the rock face, and B, B, the interstices between them.

My invention consists in making a plaster slab or board with this bevel, and with a surface to which a coat of mortar or plaster can be applied without wetting, and to which it will adhere firmly, but which surface will absorb little or no more of the moisture from the finishing coat, or any coat applied to it, than the second coat of mortar, to which the finishing coat is usually applied does. To effect this result I form a substantially uniform surface of stone spalls, or sharp sand, on the plaster slab. The spalls should lie so contiguous to one another as that if possible no plaster should come through or appear on the surface. To this end I use small spalls or chips of stone, and I find the following to be the most expeditious and economical way of arranging them for my purpose.

I take a flat plate or tray of glass, or metal with a glazed or enameled surface, or of rubber. The material of which this plate or tray is made is indifferent, but it must have a non-absorbent surface, which should be substantially flat, and may be smooth, but is preferably covered with corrugations arranged in any or no form or pattern, according to fancy. On this plate or tray I spread loosely a sufficient quantity of spalls to cover it well, and by shaking, tapping, or jarring the tray the spalls are made to spread out evenly over it, and arrange themselves on their flat sides and not on their edges. This being done, sand is sifted over them so as to fill all the lower part of the interstices of the stones and prevent the plaster when put on from running through to the under surface of the spalls or to the tray. I then blow on the spalls sufficiently hard to blow off all the particles of sand that may have lodged on their exposed surfaces, but not hard enough to disarrange the spalls themselves or the sand between them. I then spread on the spalls, thus embedded, a coat of plaster or cement of the required thickness, say five-eighths of an inch or more, putting cocoanut or other fiber in to strengthen it, and, by applying to the back of the soft mass the side of a plate of glass or metal, instead of finishing with the ordinary straight edge or trowel, and allowing this plate to remain till the plaster has set, form by one operation, first, an even surface or back; second, press the fiber into place; and also economize time and labor. When sufficiently set the slab or plaster board is taken off the plate or tray, and if any of the plaster has worked through to the face, it will present a surface roughened by the corrugations on the surface of the tray, and can be readily scraped back to the spalls, leaving a flat and comparatively smooth or regular surface of stone, and the slab is now finished ready for drying.

I thus produce a surface which has just about the degree of suction which an ordinary second coat has when wet (as it should be) to receive the finishing coat. The surface which I have described can also be formed by reversing the order of the process and spreading the plaster on the tray first and placing the spalls on it, and sanding, and pressing them into the plaster; but this is really doing the same thing, only much more slowly and laboriously and hardly as effectively, as it is important that the spalls should present their flat sides not edges, to receive the finishing coat of mortar, and that the surface of the plaster slab should be as regular and uniform as may be, and as completely covered with stone as possible. The importance of this becomes manifest when we consider the great absorbent power of plaster and the comparatively slight and slow absorption of a stone or sand surface. The absorption must be slow if the plaster is to set properly before it dries, as if it should dry first it would compel a rewetting which with its accompanying dirt in a building it is one of the objects of my invention to prevent.

When the plaster slab or board comes out of the drying room it is ready to be nailed or attached to the interior or exterior of a building, and to receive the finishing coat of plaster, taking the place of lath and of first and second coats of mortar, thus saving the time usually lost in drying those coats.

Having fully described my invention, what I claim, and desire to secure by Letters Patent, is—

1. A slab or plate of plaster or other plastic material having a surface formed of spalls or chips of stone or slag, partially embedded in the plastic material, and having their interstices partially filled with sand also embedded in the plaster backing, substantially as described.

2. The method or process of forming a plaster slab or plate, which consists in spreading spalls or chips of stone or slag loosely on a flat mold or tray, spreading over them a layer of sand partially filling the interstices in the layer of spalls, applying thereon a coat of plastic material, then embedding in it a strengthening fiber, allowing the mass to set, and removing the mass from the mold, substantially as above described.

JAMES TURLEY ALLEN.

Witnesses:
HAROLD GOODWIN,
THOS. J. HUNT.